United States Patent
Fujita et al.

(10) Patent No.: US 10,410,174 B2
(45) Date of Patent: Sep. 10, 2019

(54) LOGISTICS SOLUTION AND INTRANET SYSTEM

(71) Applicant: ALE CORPORATION, Tokyo (JP)

(72) Inventors: Masamu Fujita, Tokyo (JP); Hidekazu Ito, Tokyo (JP); Kazunori Ishiumi, Tokyo (JP)

(73) Assignee: ALE CORPORATION, Tokyo (JP)

( * ) Notice: Subject to any disclaimer, the term of this patent is extended or adjusted under 35 U.S.C. 154(b) by 366 days.

(21) Appl. No.: 15/500,541

(22) PCT Filed: Aug. 7, 2014

(86) PCT No.: PCT/JP2014/070854
§ 371 (c)(1),
(2) Date: Jan. 31, 2017

(87) PCT Pub. No.: WO2016/021015
PCT Pub. Date: Feb. 11, 2016

(65) Prior Publication Data
US 2017/0220994 A1    Aug. 3, 2017

(51) Int. Cl.
*G06Q 10/08* (2012.01)
*G06Q 50/28* (2012.01)
(Continued)

(52) U.S. Cl.
CPC ......... *G06Q 10/087* (2013.01); *G06F 11/302* (2013.01); *G06F 11/3433* (2013.01); *G06Q 10/06313* (2013.01); *G06Q 50/28* (2013.01)

(58) Field of Classification Search
CPC .......... G06Q 10/087; G06Q 10/06313; G06Q 50/28; G06F 11/302; G06F 11/3433
See application file for complete search history.

(56) References Cited

U.S. PATENT DOCUMENTS 6,151,582 A * 11/2000 Huang ................... G06Q 10/06
    705/7.25
6,587,827 B1 * 7/2003 Hennig ............... G06Q 10/087
    705/26.1
(Continued)

FOREIGN PATENT DOCUMENTS

JP    1999003101    1/1999
JP    2001-75629    3/2001
(Continued)

*Primary Examiner* — Ashford S Hayles
(74) *Attorney, Agent, or Firm* — Soroker Agmon Nordman Pte Ltd (57) ABSTRACT

A logistics-solution intranet system of the present invention includes a data bank that stores information regarding predetermined logistics, planning means that plans a process of a logistics solution based on the information regarding the predetermined logistics, execution means that transmits execution process information that an operation target device executes, based on the process planned by the planning means, a controller that transmits a work state of the operation target device, optimum process deployment means that controls the entire logistics-solution intranet system based on the information regarding the predetermined logistics, and a network that mutually communicatively couples the planning means, the execution means, and the optimum process deployment means to the controller, and the planning means, the execution means, and the optimum process deployment means are executed in a communication information process (a conversation method), and use identical hardware to be configured using an identical operating system.

4 Claims, 9 Drawing Sheets

(51) Int. Cl.
  *G06F 11/30* (2006.01)
  *G06F 11/34* (2006.01)
  *G06Q 10/06* (2012.01)

(56) References Cited

U.S. PATENT DOCUMENTS

| | | | |
|---|---|---|---|
| 7,069,235 B1 * | 6/2006 | Postelnik | G06Q 10/087 705/26.81 |
| 7,209,887 B2 * | 4/2007 | Yen | G06Q 10/063 705/7.11 |
| 7,308,416 B2 * | 12/2007 | Peachey-Kountz | G06Q 10/06 705/7.12 |
| 7,475,024 B1 * | 1/2009 | Phan | G06Q 10/087 705/22 |
| 8,799,218 B2 * | 8/2014 | Liu | G06Q 10/10 707/617 |
| 9,704,121 B2 * | 7/2017 | Von Helmolt | G06Q 10/087 |
| 9,740,992 B2 * | 8/2017 | Fazal | G06Q 10/06 |
| 9,760,944 B2 * | 9/2017 | Kleinhandler | G06Q 30/0635 |
| 9,792,634 B2 * | 10/2017 | Masuko | G06Q 10/087 |
| 2001/0032146 A1 * | 10/2001 | Kutaragi | G06Q 10/087 705/26.81 |
| 2002/0042756 A1 * | 4/2002 | Kumar | G06Q 10/06 705/7.31 |
| 2002/0049622 A1 * | 4/2002 | Lettich | G06Q 10/063 705/7.11 |
| 2002/0128913 A1 * | 9/2002 | Ower | G05B 19/41865 705/22 |
| 2003/0014287 A1 * | 1/2003 | Williams | G06Q 10/0635 705/7.28 |
| 2003/0014317 A1 * | 1/2003 | Siegel | G06Q 10/087 705/22 |
| 2003/0033205 A1 * | 2/2003 | Nowers | G06Q 30/06 705/26.2 |
| 2003/0036981 A1 * | 2/2003 | Vaughan | G06Q 10/02 705/28 |
| 2003/0105684 A1 * | 6/2003 | Dunn | G06Q 10/087 705/28 |
| 2003/0163385 A1 * | 8/2003 | Mori | G06Q 10/087 705/26.8 |
| 2003/0191698 A1 * | 10/2003 | Brown | G06Q 10/087 705/28 |
| 2004/0177075 A1 * | 9/2004 | Rangadass | G06Q 10/06 |
| 2004/0267630 A1 * | 12/2004 | Au | G06Q 30/06 705/80 |
| 2005/0004831 A1 * | 1/2005 | Najmi | G06Q 10/06 705/7.22 |
| 2005/0049958 A1 * | 3/2005 | Macolino | G06Q 10/06 705/37 |
| 2005/0055260 A1 * | 3/2005 | Yamamoto | G06Q 10/06316 705/7.26 |
| 2005/0060270 A1 * | 3/2005 | Ramakrishnan | G06Q 10/04 705/400 |
| 2005/0096998 A1 * | 5/2005 | Gieselmann | G06Q 10/087 705/26.5 |
| 2005/0150951 A1 * | 7/2005 | Sacco | G06Q 10/087 235/385 |
| 2005/0187833 A1 * | 8/2005 | Royer | G06Q 10/087 705/28 |
| 2006/0173928 A1 * | 8/2006 | Slone | G06F 16/27 |
| 2006/0250248 A1 * | 11/2006 | Tu | G06Q 10/06 340/572.4 |
| 2006/0259376 A1 * | 11/2006 | Ferreri | G06Q 10/087 705/28 |
| 2006/0287925 A1 * | 12/2006 | Taylor | G06Q 30/02 705/26.61 |
| 2007/0124216 A1 * | 5/2007 | Lucas | G06Q 10/087 705/26.1 |
| 2007/0214063 A1 * | 9/2007 | Kahlon | G06Q 20/203 705/28 |
| 2008/0051923 A1 * | 2/2008 | Knipfer | G06Q 10/0631 700/105 |
| 2008/0208710 A1 * | 8/2008 | Taguchi | G06Q 30/06 705/26.8 |
| 2009/0138384 A1 * | 5/2009 | McCormick | G06Q 10/0637 705/28 |
| 2010/0280912 A1 * | 11/2010 | Gopalpur | G06Q 20/203 705/22 |
| 2011/0264555 A1 * | 10/2011 | Turner-Rielle | G06Q 30/06 705/26.8 |
| 2011/0295643 A1 * | 12/2011 | Miller | G06Q 10/06 705/7.23 |
| 2012/0150699 A1 * | 6/2012 | Trapp | G06Q 10/08 705/28 |
| 2012/0158553 A1 * | 6/2012 | Sudhidhanakul | G06Q 10/087 705/28 |
| 2012/0296679 A1 * | 11/2012 | Im | G06Q 10/02 705/5 |
| 2012/0323633 A1 * | 12/2012 | Chowdhary | G06Q 10/047 705/7.31 |
| 2013/0066753 A1 * | 3/2013 | Doyle | G06Q 10/087 705/28 |
| 2013/0151381 A1 * | 6/2013 | Klein | G06Q 30/0641 705/27.1 |
| 2014/0143005 A1 * | 5/2014 | Jatla | G06Q 10/06313 705/7.23 |
| 2014/0279294 A1 * | 9/2014 | Field-Darragh | G06Q 10/087 705/28 |
| 2015/0112750 A1 * | 4/2015 | Grichnik | G06Q 10/087 705/7.23 |
| 2016/0171409 A1 * | 6/2016 | Asadi-Shahmirzadi | G06Q 10/06315 705/7.25 |
| 2016/0267417 A1 * | 9/2016 | Tomiyama | G06Q 50/30 |
| 2017/0220994 A1 * | 8/2017 | Fujita | G06Q 50/28 |

FOREIGN PATENT DOCUMENTS

| | | |
|---|---|---|
| JP | 2002-183485 | 6/2002 |
| JP | 2003-109170 | 4/2003 |
| JP | 2004-133808 | 4/2004 |

* cited by examiner

※1 Real achievement management data accumulation process  ※2 Business information reception and accumulation process
※3 Business information  ※4 Planning information  ※5 Control communication process (reception)
※6 Controller  ※7 Planning deployment process  ※8 Automatization process  ※9 Execution unit deployment process
※10 Planning change process (sequence and unit change)  ※11 Execution condition  ※12 Entire optimum information (entirety)
※13 All is not allocated  ※14 Allocation condition  ※15 Optimum allocation information (execution unit)
※16 Execution sequence determination  ※17 To [2.2 Delivery and shipping instructions and orders deployment process]

LOGISTICS SOLUTION AND INTRANET SYSTEM

TECHNICAL FIELD

The present invention relates to a logistics-solution intranet system in order to establish ail optimum solution system in a logistics process.

BACKGROUND ART

In a current logistics system, an upper business system having business information, a physical distribution information database processing system, and a material handling system are coupled by a network one another to be operated. A physical distribution information database processing is referred to as different names depending on respective manufacturers, and is referred to as a WMS (Warehouse Management System) or a physical distribution CPU. A facility control processing is also referred to as different names depending on respective equipment manufacturers, and is referred to as, for example, a WCS (Warehouse Control System) or a ground controller.

Figure 9:
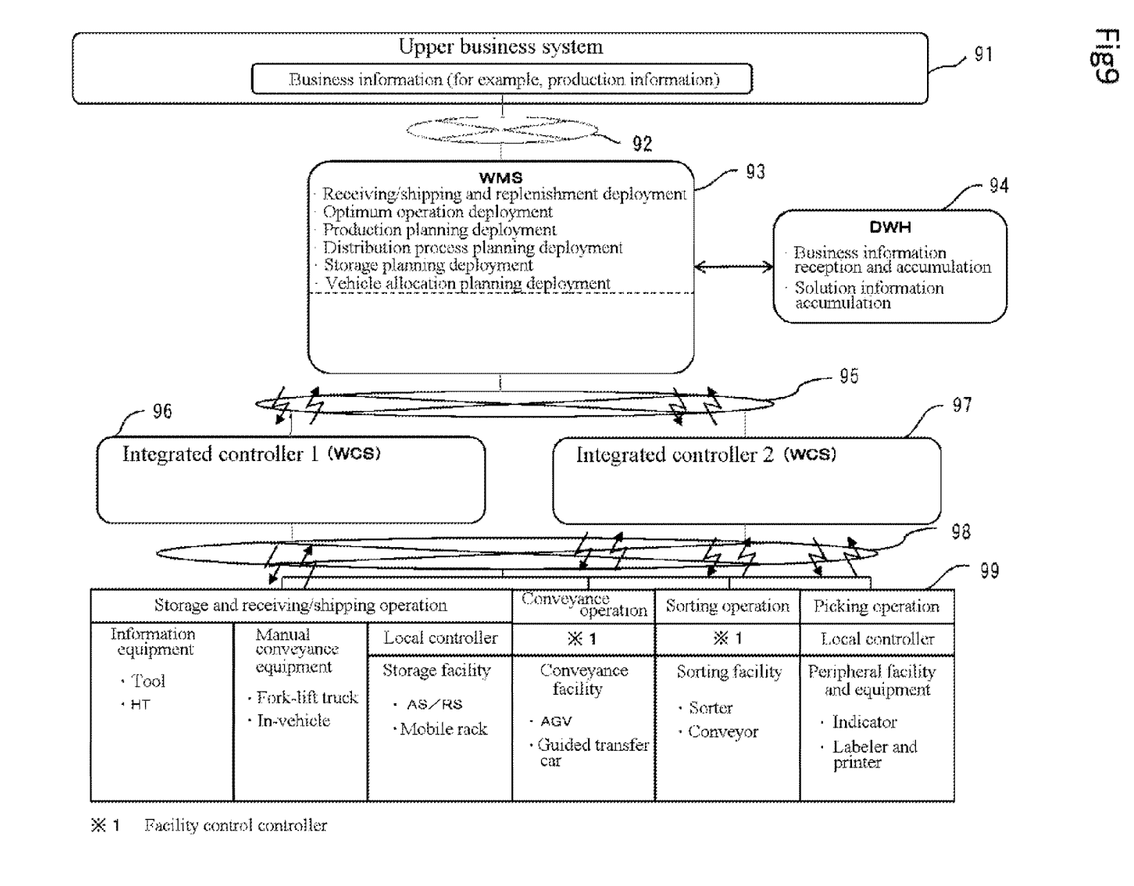
FIG. 9 is a drawing that illustrates a configuration of a conventional logistics-solution intranet system.

FIG. 9 illustrates a configuration of a conventional logistics system. Respective systems of an integrated controller 1 (WCS) 96 and an integrated controller 2 (WCS) 97, which control a WMS 93 and an operation device group 99 in FIG. 9, are provided as black boxes that does not opened. This is in status where only specific IT manufacturer and equipment manufacturer can cope with modifications in accordance with a change of facility and an operational change. Therefore, the system configuration cannot achieve its flexibility and scalability. A data warehouse (DWH) 94 often employs hardware and an OS different from that of the WMS 93. The DWH 94 is in a black-box state. The conventional system has stratified different hardware, software, and databases (DBs) via I/Fs with communication, between the upper business system 91, the WMS 93, and the controllers 96 and 97. The respective software and DBs are in black-box states, thus being in status that has to rely on a specific manufacturer that has closed and professional knowledge.

The stratification of logistics functions independently employs an OS, a DB, and a programming language compatible for a property of the database processing and an OS and a programming language compatible for a property of the control processing. The respective OSs and programming languages are different. A system (IT) manufacturer develops the physical distribution information system, and an equipment manufacturer develops the control system. This increases modification regions and portions in accordance with a system change and the change of facility; thus, system extension cannot be achieved to increase a risk of system failure. Constant maintenance and support bound by the equipment manufacturer even after operation increases a maintenance cost, increases a cost that cannot be assessed, such as an unnecessary modification and a substrate exchange, and increases respective replacement costs in accordance with respective maintenance expirations. This result inhibits a flexible logistics system from further becoming popular.

The stratification of the physical distribution information database processing and the facility control processing is a factor that inhibits immediacy of a troubleshooting from status that cannot correspond without broad knowledge of the physical distribution information processing referred to as a planning system, and the facility control processing referred to as an execution system in the logistics, when a communication failure, a trouble in a facility device, a trouble in improper data in the physical distribution information, a trouble in physical distribution work operation, and similar trouble occur. This considerably influences the operation of the work.

CITATION LIST

Patent Literature

Patent Literature 1: Japanese Unexamined Patent Application Publication No. 2007-226718

SUMMARY OF THE INVENTION

Problems to be Solved

The object of the present invention is to provide a logistics-solution intranet system that ensures effective process planning and execution of various processes in the logistics and monitors a processing status to ensure a real-time correspondence when a change occurs in the processing status.

Solution to the Problems

In a logistics-solution intranet system of the present invention, the logistics-solution intranet system that plans and executes an optimum solution system in a logistics process includes a data bank that stores information regarding predetermined logistics, planning means that plans a process of a logistics solution based on the information regarding the predetermined logistics, execution means that transmits execution process information that an operation target device executes, based on the process planned by the planning means, a controller that controls the operation target device, the controller receiving the execution process information of the operation target device from the execution means, operating the operation target device based on the execution process information, and transmitting a work state of the operation target device, optimum process deployment means that controls the entire logistics-solution intranet system based on the information regarding the predetermined logistics, and a network that mutually communicatively couples the planning means, the execution means, and the optimum process deployment means to the controller. The planning means, the execution means, and the optimum process deployment means execute deployment of a logistics solution in communication information processing (a conversation method) into which operation software having respective functions assimilates, and use identical hardware to be configured using an identical operating system. The optimum process deployment means determines whether the process planned by the planning means is optimum based on the work state of the operation target device received from the controller and the information regarding the logistics, and transmits a conversation method information signal that indicates replanning of the process to the planning means when the planned process is determined to be not optimum. The execution means replans the process to transmit new process planning to the optimum process deployment means when receiving the conversation method information signal that indicates the replanning of the process. The optimum process deployment means determines whether the new process planning is optimum.

The logistics-solution intranet system of the present invention ensures that the optimum process means obtains the work state of the operation target device from the controller during the operation of the operation target device, and transmits a conversation method information signal that indicates replanning of the process to the planning means when the planned process and the work state are determined to be different after comparison, the planning means replans the process to transmit new process planning to the optimum process deployment means when the planning means receives the conversation method information signal that indicates the replanning of the process, and the optimum process deployment means determines whether the new process planning is optimum, and transmits the process planning to the execution means when the new process planning is determined to be optimum, and transmits the conversation method information signal that indicates the replanning of the process to the planning means when the new process planning is determined to be not optimum.

Further, the data bank of the present invention ensures storing the predetermined logistics information, and information of the process planning of the planning means and information of an execution process of the execution means by control of the optimum process means, and ensures a real-time update when update information is present.

A logistics solution system, which is another aspect of the present invention, includes a plurality of logistics-solution intranet systems that plan and execute optimum solution systems in a logistics process and a data bank that stores information regarding predetermined logistics. Each of the logistics-solution intranet system includes planning means that plans a process of a logistics solution based on the information regarding the predetermined logistics stored in the data bank, execution means that transmit execution process information that an operation target device executes, based on the process planned by the planning means, a controller that controls the operation target device, the controller receiving the execution process information of the operation target device from the execution means, operating the operation target device based on the execution process information, and transmitting a work stale of the operation target device, optimum process deployment means that controls the entire logistics-solution intranet system based on the information regarding the predetermined logistics stored in the data bank, and a network that mutually communicatively couples the planning means, the execution means, and the optimum process deployment means to the controller, and the planning means, the execution means, and the optimum process deployment means use identical hardware to be configured using an identical operating system, the optimum process deployment means determines whether the process planned by the planning means is optimum based on the work state of the operation target device received from the controller and the information regarding the logistics, and transmits a conversation method information signal that indicates replanning of the process to the planning means when the planned process is determined to be not optimum, the execution means replans the process to transmit new process planning to the optimum process deployment means when receiving the conversation method information signal that indicates the replanning of the process, and the optimum process deployment means determines whether the new process planning is optimum. Each of the logistics-solution intranet systems causes the data bank to store information of the process planning of the planning means and information of an execution process of the execution means by control of the optimum process means, and updates the data bank in real time when update information is present.

Effects of the Invention

The logistics-solution intranet system of the present invention processes the process planning and execution of the various processes in the logistics with the identical operating system using the identical hardware to ensure more effective operation of the system. The logistics-solution intranet system of the present invention monitors the process status of the operation target device in real time, and re-examines the planning process and the execution process to process when a change occurs in the process status. This has an advantage that ensures a flexible and real-time correspondence with respect to the change.

DESCRIPTION OF THE EMBODIMENTS

An embodiment of a logistics-solution intranet system of the present invention will be described by referring to the attached drawings.

Figure 1:
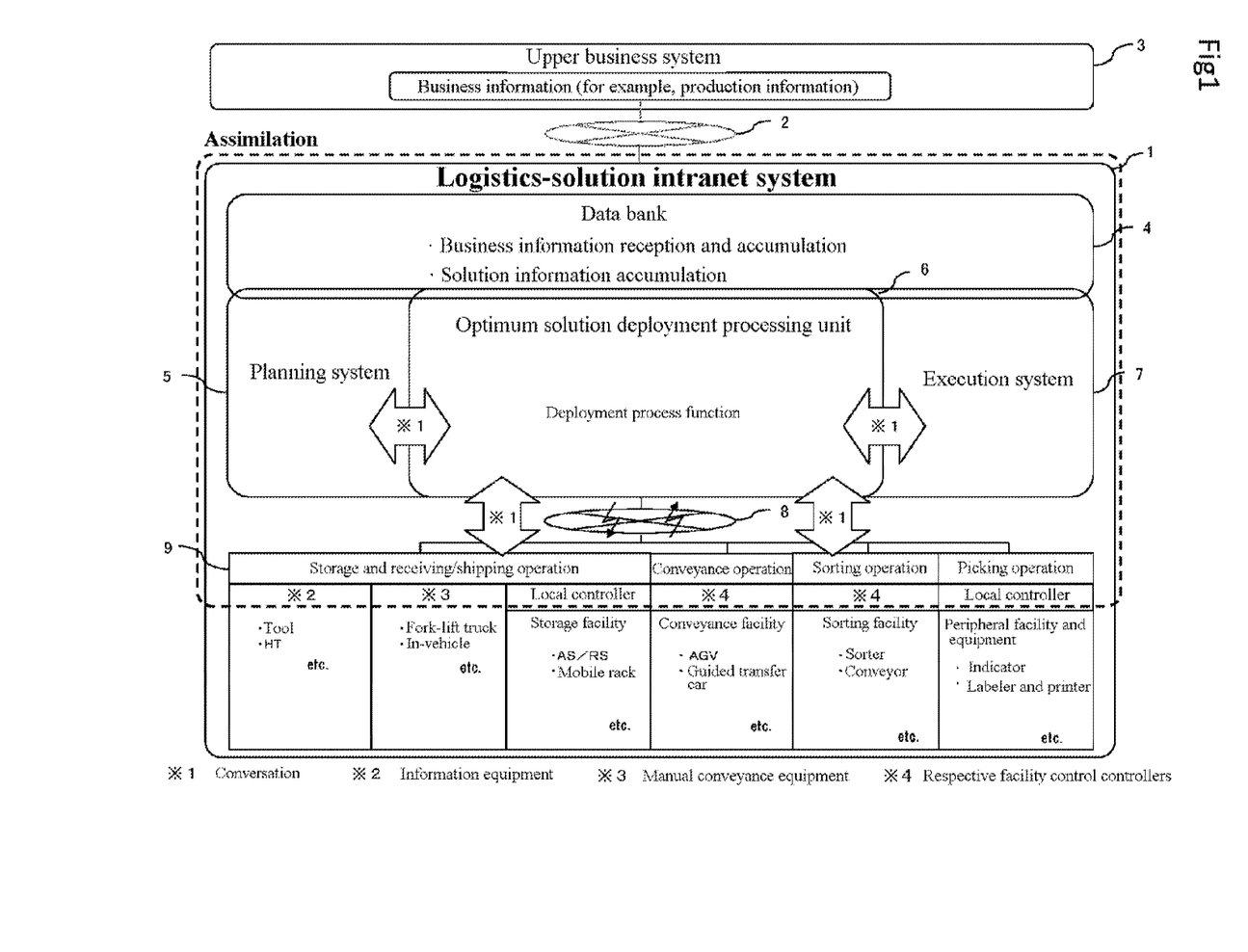
FIG. 1 is a drawing that illustrates a configuration of a logistics-solution intranet system according to an embodiment of the present invention.

FIG. 1 illustrates a configuration of the logistics-solution intranet system according to the embodiment of the present invention. A logistics-solution intranet system 1 of this embodiment is coupled to an upper business system 3 that has business information via a communication network 2, and includes an intranet-system data bank 4, an intranet-system planning system 5, an intranet optimum solution deployment processing unit 6, an intranet-system execution system 7, an operation device controller group 9, and a communication network 8. The communication network 8 mutually communicatively couples the intranet-system planning system 5, the intranet optimum solution deployment processing unit 6, and the intranet-system execution system 7 to the operation device controller group 9.

Here, the communication network 2 may be one of the Internet, a public line, a leased line, and similar line, or its mixture. It is only necessary that the communication network 8 has a communication function using a control network (for example, CC_Link, PROFIBUS/PROFINET, CANopen, or EtherNet/IP) or a direct control (for example, a converter).

The intranet optimum solution deployment processing unit 6 executes an information deployment process for a rational execution of operation (an execution action) that optimizes transmission, orders, and synchronization, and timing for each in order to execute an optimum and rational operation work on the operation device controller group 9. The intranet optimum solution deployment processing unit 6 executes deployment processes of a receiving/shipping and replenishment function, a receiving/shipping and replenishment instruction function, a shipping and picking instruction function, a traceability function, and similar function.

The intranet-system planning system 5 deploys execution information that is extremely effective and rational for respective optimum operation in respective business execution works (wide-ranging logistics operation planning related to, for example, receiving/shipping and replenishment planning, optimum operation planning, production planning, distribution process planning, storage planning, customer management, and delivery) from business information, production information, order information, receiving/shipping information, customer information, and similar information in work processes regarding the logistics. The intranet-system planning system 5 executes the information deployment process in which work operations that have ensured the respective planning are optimized. Furthermore, the intranet-system planning system 5 periodically executes a new information deployment process based on operation execution status of the respective work executions and their information management to plan and execute logistics solution. These status and information management include, for example, the following ones.

There are, for example, scheduling and grasping of execution status, synchronization management, appropriate operation instruction, improvisational addition and change, update and management of delivery status, update and management of logistics information, stock deployment management, management of business information (delivery lot) in respective works, traceability management: information management required for respective businesses (for example, quality, delivery deadline, cost, and best-before date), material handling system management, life cycle management, achievement management (allocation, execution, result, history, and operational achievement).

The intranet-system execution system 7 deploys work instructions required for effective execution of the work process in the logistics in real time based on the planning information created in the intranet-system planning system 5, executes optimum instructions and commands for respective operators, and information (IT equipment and communication), and a single body of the equipment (including tools) and an agglomerate of this equipment group (referred to as a system) that execute the operation, grasps facility status from a completion report and a status report of control equipment, and executes new instructions and commands in order to execute optimum logistics operation in real time while attaining synchronization between facilities.

In order to exchange information required for management of, for example, prediction, planning, and achievement related to logistics business, as effective logistics management information obtained from the intranet-system planning system 5 and the intranet-system execution system 7 for respective business information of the upper business system in real time, the intranet-system data bank 4 updates this logistics information in real time, executes optimum and rational data management and storage, and executes transition of the information while communicating and providing effective data as the information of the intranet-system planning system 5.

The operation device controller group 9 includes information equipment, manual conveyance equipment, and a storage-facility local controller including, for example, a mobile rack and a rotary rack used for storage and receiving/shipping operation, a conveyance-facility control controller including, for example, a conveyor and a vertical carrier machine used for conveyance operation, a sorting-facility control controller including, for example, a sorter and a conveyor used for sorting operation, a peripheral-facility-and-equipment local controller including, for example, an indicator, and a labeler and a printer used for picking operation, and similar equipment. The operation device controller group 9 obtains execution process information including the instructions and commands from the intranet-system execution system 7 to control operation target devices and facilities.

Figure 2:
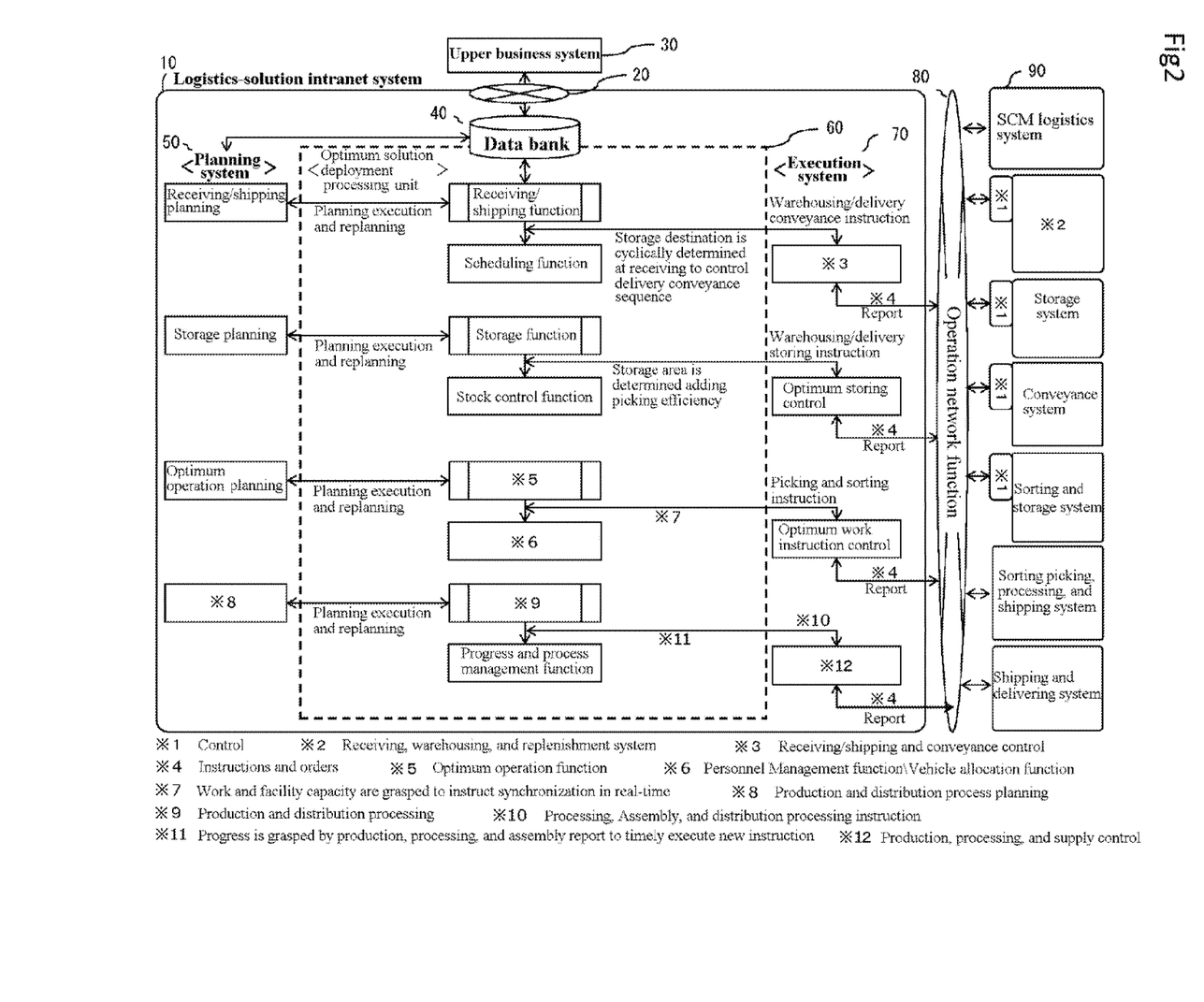
FIG. 2 is a drawing that illustrates the configuration of the logistics-solution intranet system in FIG. 1 in detail.

FIG. 2 is a drawing that illustrates the configuration of the logistics-solution intranet system in FIG. 1 in detail. A logistics-solution intranet system 10 is consists of a communication network 20 that couples an upper business system 30 to the intranet system 10, an intranet-system planning system 50, an intranet-system optimum solution deployment processing unit 60, an intranet-system execution system 70, a communication network 80 that couples the intranet system 10 to an operation device controller group 90, the operation device controller group 90, and an intranet-system data bank 40. In the logistics-solution intranet system 10 in FIG. 2, the internet-system planning system 50, the intranet optimum solution deployment processing unit 60, and the intranet-system execution system 70 that ensure optimum operation of the work process are configured using identical hardware and use an identical operating system. The data bank 40 can be installed in an identical hardware configuration, and may be configured using another storage device.

The following describes operation of the logistics-solution intranet system with reference to FIG. 2.

First, the logistics-solution intranet system 10 receives the business information (for example, the production information, the order information, the receiving/shipping information, and the customer information) from the upper business system 30 via the communication network 20 to accumulate in the intranet-system data bank 40.

The intranet-system planning system 50 creates planning data (tor example, the production planning, receiving/shipping planning, the distribution process planning, vehicle allocation planning, and the storage planning) in order to ensure the optimum operation in the logistics, based on the business information and the logistics management information accumulated in the intranet-system data bank 40.

The intranet optimum solution deployment processing unit 60 has a function that deploys schedule data (for example, a shipping schedule, a replenishment schedule, a picking schedule, a packing schedule, a sorting schedule, and a loading schedule) that makes an operation work effective based on the planning data under the grasping of the status of the respective facilities in real time, and if there is a condition that generates a planning change by various conditions (for example, a facility unit capacity, personnel productivity, progression in process, operating status of the storage facility) reported from the intranet-system execution system 70, transmits the information for replanning to the intranet-system planning system 50 to deploy a result that the intranet-system planning system 50 has replanned to the schedule data again.

The intranet optimum solution deployment processing unit 60 grasps the status of the respective facilities reported from the intranet-system execution system 70 in real time based on the created executable schedule data to transmit the instructions and commands with respect to the operation device controller group to the intranet-system execution system 70.

Furthermore, the intranet-system execution system 50 transmits conveyance, storing, sorting, and picking instructions instructed from the intranet optimum solution deployment processing unit 60 to the operation device controller group 90 via the communication network 80 in real time, while attaining synchronization of operation of respective facility groups and synchronization between the facility groups.

In a case of receiving acceptance operation, an HT device or similar device of the operation device controller group 90 inspects goods. A labeler device of the operation device controller group 90 outputs a warehousing label on which a warehousing recommended position is written, with respect to the goods determined as acceptable products. The goods are conveyed to the warehousing recommended position by a fork-lift truck or a platform truck, in accordance with a printing content of the label. When storing in an AS/RS, which is a facility introduced in storage operation, of the operation device controller group 90, in order to transfer the goods to the conveyor to be automatically conveyed, the intranet optimum solution deployment processing unit 60 monitors the status between the facilities in real time to transmit the instructions and commands to a conveyance facility device of each of the operation device controller group 90 and the instructions and commands with respect to the operation device controller group to the intranet-system execution system 70.

Furthermore, the intranet-system execution system 70 timely transmits the instructions and commands to the operation device controller group 90 via the communication network 80 to execute automatic warehousing conveyance to an optimum stored position.

The intranet optimum solution deployment processing unit 60 tracks the data between the facility devices, and a conveyance object, based on report data of warehousing completion and conveyance state received from each of the operation device controller group 90 via the communication network 80, to execute an integral control to control the respective facility devices.

In a case of the storage operation, the intranet optimum solution deployment processing unit 60 determines optimum storage areas for respective goods and products, based on the storage planning deployed in the intranet-system planning system 50. The intranet optimum solution deployment processing unit 60 monitors the status between the facilities in real time to/transmit the instructions and commands with respect to the operation device controller group to the intranet-system execution system 70.

Furthermore, the intranet-system execution system 70 timely transmits the instructions and commands to the operation device controller group 90 via the communication network 80 to execute automatic storage to an optimum stored position.

The intranet optimum solution deployment processing unit 60 trades the data between the facility devices, and the conveyance object, based on the report data of warehousing completion, delivery completion, and conveyance state received from each of the operation device controller group 90 via the communication network 80, to execute the integral control to control the respective facility devices.

For the warehousing/delivery to/from an optimum stored position that is not automated, the intranet optimum solution deployment processing unit 60 determines the optimum storage area. Manual conveyance with the fork-lift truck or the platform truck is performed in accordance with the contents of instructions and commands using the HT device of the operation device controller group 90, and the state of the stored location is confirmed. The warehousing/delivery are executed to/from a location where shipping and picking operation is rational and storage efficiency can be highly maintained.

In a case of replenishment operation, the intranet optimum solution deployment processing unit 60 obtains a calculation result of stock transition of the respective goods and products, based-on the replenishment planning-deployed in the intranet-system planning system 50. For the goods and products whose stock is insufficient or below a stock level in real time, the intranet optimum solution deployment processing unit 60 calculates replenishment amounts to create a prioritized replenishment schedule.

In the replenishment operation, the intranet optimum solution deployment processing unit 60 calculates an order where the stock shortage occurs with linking with the shipping schedule, executes replenishment allocation from a replenishment-higher-priority item, determines a conveyance route for ensuring optimum replenishment operation, and then monitors the status between the facilities required for the respective operation in real time to transmit the instructions and commands with respect to each of the operation device controller group 90 to the intranet-system execution system 70.

Furthermore, the intranet-system execution system 70 timely transmits delivery and conveyance instructions and commands via the communication network 80. The intranet optimum solution deployment processing unit 60 tracks the data between the facility devices, and the conveyance object, based on the report data of replenishment completion and conveyance state received from each of the operation device controller group 90 via the communication network 80, to execute the integral control to control the respective facility devices.

In a case of shipping operation, the intranet optimum solution deployment processing unit 60 sequentially allocates the stock whose condition is satisfied from the storage facility, the conveyance facility, and peripheral equipment status of a prior allocation position, based on the shipping planning deployed in the intranet-system planning system 50, to create a prioritized shipping schedule. In the shipping operation, the intranet optimum solution deployment processing unit 60 determines the conveyance route for ensuring optimum shipping operation and picking operation, and then monitors the status between the facilities required for the respective operation in real time to transmit the instructions and commands with respect to each of the operation device controller group 90 to the intranet-system execution system 70.

Furthermore, the intranet-system execution system 70 timely transmits the delivery and conveyance instructions and commands via the communication network 90. The intranet optimum solution deployment processing unit 60 tracks the data between the facility devices, and the conveyance object, based on the report data of delivery completion and conveyance state received from each of the operation device controller group 90 via the communication network 80, to execute the integral control to control the respective facility devices.

In the picking operation, the intranet optimum solution deployment processing unit 60 determines the conveyance route for ensuring optimum and timely picking operation using a reliable indicator device of the operation device controller group 90, based on the shipping planning deployed in the intranet-system planning system 50, and then monitors the status between the facilities required for the respective operation in real time to transmit the instructions and commands with respect to each of the operation device controller group 90 to the intranet-system execution system 70.

Furthermore, the intranet-system execution system 70 timely transmits the picking instructions and commands via the communication network 80 with synchronizing with persons.

The intranet optimum solution deployment processing unit 60 tracks the data between the facility devices, and the conveyance object based on the report data of picking completion and facility state received from each of the operation device controller group 90 via the communication network 80, to execute the integral control to control the respective facility devices.

In automatic stowage and packing operation, where the picking operation is automated, by a robot, a stowage device, and similar device of the operation device controller group 90, the optimum solution deployment processing unit 60 calculates stowage patterns in destination units based on shipping operation information to transmit the instructions and commands with respect to the robot, the stowage device, and similar device to the intranet-system execution system 70.

Furthermore, the intranet-system execution system 70 timely transmits the stowage instructions and commands via the communication network 80

In a case of the sorting operation, the intranet optimum solution deployment processing unit 60 determines sorting lines in the destination units for ensuring high-speed and accurate sorting operation using a reliable sorting device (sorter) of the operation device controller group 90, based on the shipping planning deployed in the intranet-system planning system 50, and then monitors the status between the facilities required for the sorting operation in real time to transmit the instructions and commands with respect to each of the operation device controller group 90 to the intranet-system execution system 70.

Furthermore, the intranet-system execution system 70 timely transmits the sorting instructions and commands via the communication network 80. The intranet optimum solution deployment processing unit 60 tracks the data between the facility devices, and the conveyance object, based on the repeat data of sorting completion and facility state received from each of the operation device controller group 90 via the communication network 80, to execute the integral control to control the respective facility devices.

Table 1 indicates a main function composition of the logistics-solution intranet system in FIG. 2. Main functions in Table 1 are examples. The function can be changed as necessary corresponding to a desired logistics system.

TABLE 1

Main functions of logistics-solution intranet system

| Logistics real achievement management data accumulation process | Logistics real operation planning process | Logistics real operation optimum solution process | Logistics real operation execution process |
|---|---|---|---|
| 1. Information data real accumulation function<br>Backbone system information accumulation function<br>Planning system information accumulation function<br>Execution system information accumulation function<br>2. Control data real accumulation function<br>Facility operating information accumulation function<br>Control communication history accumulation function<br>3. Real analysis and evaluation function<br>Work capacity management function<br>Facility capacity management function<br>Achievement evaluation function<br>Capacity evaluation and reflecting function<br>4. Traceability function<br>Manufacturing lot tracing function | 1. SCM logistics planning<br>Optimum sales planning<br>2. Receiving/shipping and replenishment real planning<br>Receiving/shipping planning<br>Order and shipping planning<br>Shipping adjustment planning<br>Production order planning<br>Purchase order planning<br>Released order planning<br>Supply planning<br>3. Warehouse storage real planning<br>Optimum stock unified planning<br>Optimum proper stock planning<br>Optimum stock arrangement planning<br>Optimum base stock planning<br>Real location planning<br>Appropriate material arrangement planning<br>(Rack movement and warehouse change)<br>4. Optimum operation real planning<br>Operation planning<br>Personnel planning<br>Vehicle allocation planning<br>5. Production real planning<br>Processing planning<br>Assembly planning<br>Shipping planning<br>Progress management<br>6. Distribution processing real planning<br>Distribution processing planning<br>7. Traceability function<br>Manufacturing lot tracing function | 1. Warehousing/delivery real execution funtion<br>Acceptance function<br>Receiving inspection function<br>Released order function<br>Receiving accumulation function<br>Control communication function (conveyance and warehousing)<br>Customer returns function<br>2. Storage real execution function<br>Storage module management function<br>Location management function<br>Proper stock function<br>3. Replenishment and supply real execution function<br>Scheduled replenishment and supply function<br>Urgent replenishment and supply function<br>Replenishment and supply amount calculation function<br>4. Shipping scheduling function<br>Shipping real execution function<br>Urgent shipping function<br>Stock allocation function<br>Optimum shipping instruction function<br>Picking location management function<br>Picking function<br>Shipping accumulation function<br>Manufacturer returns function<br>Movement between bases function<br>5. Traceability function<br>Manufacturing lot tracing function | 1. Warehousing/delivery real control function<br>Control communication function (conveyance and warehousing)<br>2. Storage real control function<br>Control communication function (storage)<br>3. Replenishment and supply real control function<br>Control communication function (delivery and conveyance)<br>4. Shipping real control function<br>Control communication function (delivery and conveyance)<br>5. Facility real control function<br>Control communication function (completion report)<br>Facility condition management function<br>Storage and conveyance control function<br>Tracking function<br>Picking control function<br>Sorting control function<br>Ledger sheet and label output control function<br>6. Facility and capacity<br>7. Traceability function<br>Manufacturing lot tracing function |

FIG. 3, FIG. 4, FIG. 5, FIG. 6, and FIG. 7 are flowcharts of detail functions regarding the delivery and the shipping among functions that constitute the logistics-solution intranet system. The logistics-solution intranet system is constituted of a communication network 602 that couples an upper business system 601 to an intranet system 600, an intranet-system real achievement management data accumulation process 603, an intranet-system real operation planning deployment process 611, an intranet-system real operation optimum solution process 621, an intranet-system real operation process 661, a communication network 682 that couples the intranet system to an automatization facility 681, and the automatization facility 681. The real achievement management data accumulation process 603, the real operation planning deployment process 611, the real operation optimum solution process 621, and the real operation execution process 661 that ensure the optimum operation of the work process are ensured by an identical operating system using identical hardware.

The following describes a process content with reference to these drawings.

Figure 3:
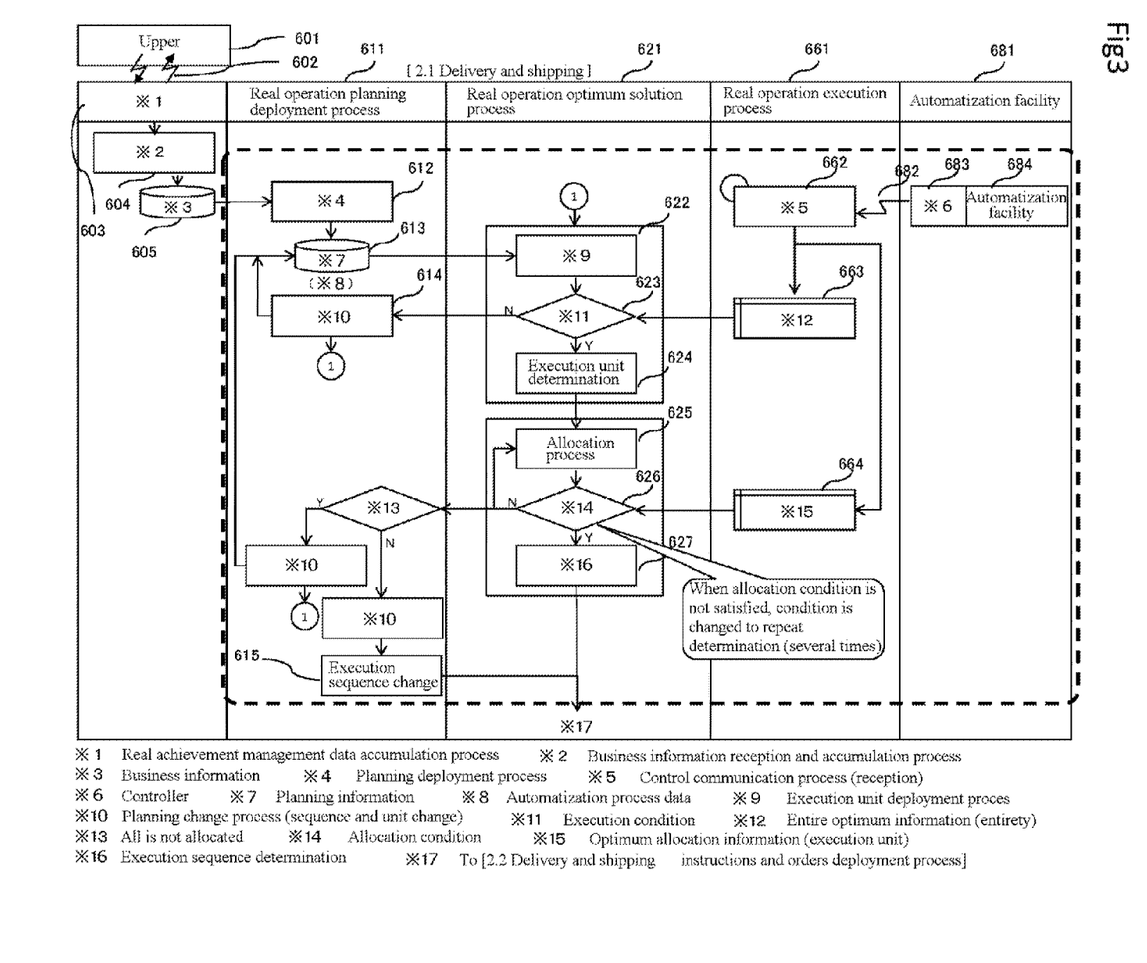
FIG. 3 is a flowchart of a function of the logistics-solution intranet system of the embodiment.

The intranet real achievement management data accumulation process 603 receives the business information (for example, the production information, the order information, the receiving/shipping information, and the customer information) from the upper business system 601 via the communication network 602 to accumulate in an intranet-system real achievement management data bank (604 and 605 in FIG. 3).

The intranet-system real operation planning deployment process 611 deploys SCM logistics planning (sales planning), receiving/shipping and replenishment real planning (for example, receiving/shipping planning, order and shipping planning, shipping adjustment planning, production order planning, purchase order planning, released order and supply planning), warehouse storage real planning (optimum stock unified planning, optimum stock planning, optimum stock, arrangement planning, optimum base stock planning, real location planning, and appropriate material arrangement planning), optimum operation real planning (operation planning, personnel planning, and vehicle allocation planning), production real planning (process planning, assembly planning, shipping planning, and progress planning), distribution processing real planning (distribution processing), and the traceability function (a manufacturing lot tracing function), which have achieved optimization of the logistics operation, in real time, based on business information 605 accumulated at the intranet-system real achievement management data accumulation process 603, to hold data for handing over to an execution process of the intranet real operation optimum solution process 621 (612 in FIG. 3).

The intranet real operation optimum solution process 621 determines a condition in units (grouping) for optimally executing the planning from entire optimum information (for example, an automatization system status, a manual system status, a facility receiving/shipping capacity, a facility conveyance capacity, and a facility sorting capacity) 663 as an execution condition in real time, based on shipping planning information 613 created at the intranet real operation planning deployment process 611, repeats the determination with changing the condition until the execution condition is fulfilled, and then executes scheduling with considering a priority in a unit that has achieved leveling of work and facility operational availability when fulfilling a range of the execution condition (622, 623, and 624 in FIG. 3).

At this time, for the shipping instruction that does not meet the execution condition, the real operation optimum. Solution process 621 requests re-creation of the planning because of an unmatched condition in real time from the intranet real operation planning deployment process 611. The intranet real operation planning deployment 611 executes replanning 614 of the shipping instruction that has been determined as inexecutable. Afterwards, the intranet real operation optimum solution process 621 determines the execution unit again based on the replanned shipping planning data, and then confirms that the execution unit is in a range of the condition to determine the execution unit again (624 in FIG. 3).

Furthermore, after determining the execution unit, a stock allocation function executes stock allocation processes by execution units (625), determines the execution condition from optimum allocation information (an automatization system status) 664 required for the allocation in real time, repeats the determination with changing the condition until an allocation condition is fulfilled, and then executes a real stock allocation when the condition has fulfilled a range of the allocation condition (626 and 627). At this time, when the shipping instructions that do not meet the execution conditions are not all allocatable, the intranet-system real operation optimum solution process 621 requests the re-creation of the planning because of the real time unmatched condition from the intranet real operation planning deployment process 611. The intranet real operation planning deployment process 611 executes the replanning of the shipping instruction that has been determined as inexecutable, for example, a change of delivery destination (615 in FIG. 3).

Figure 4:
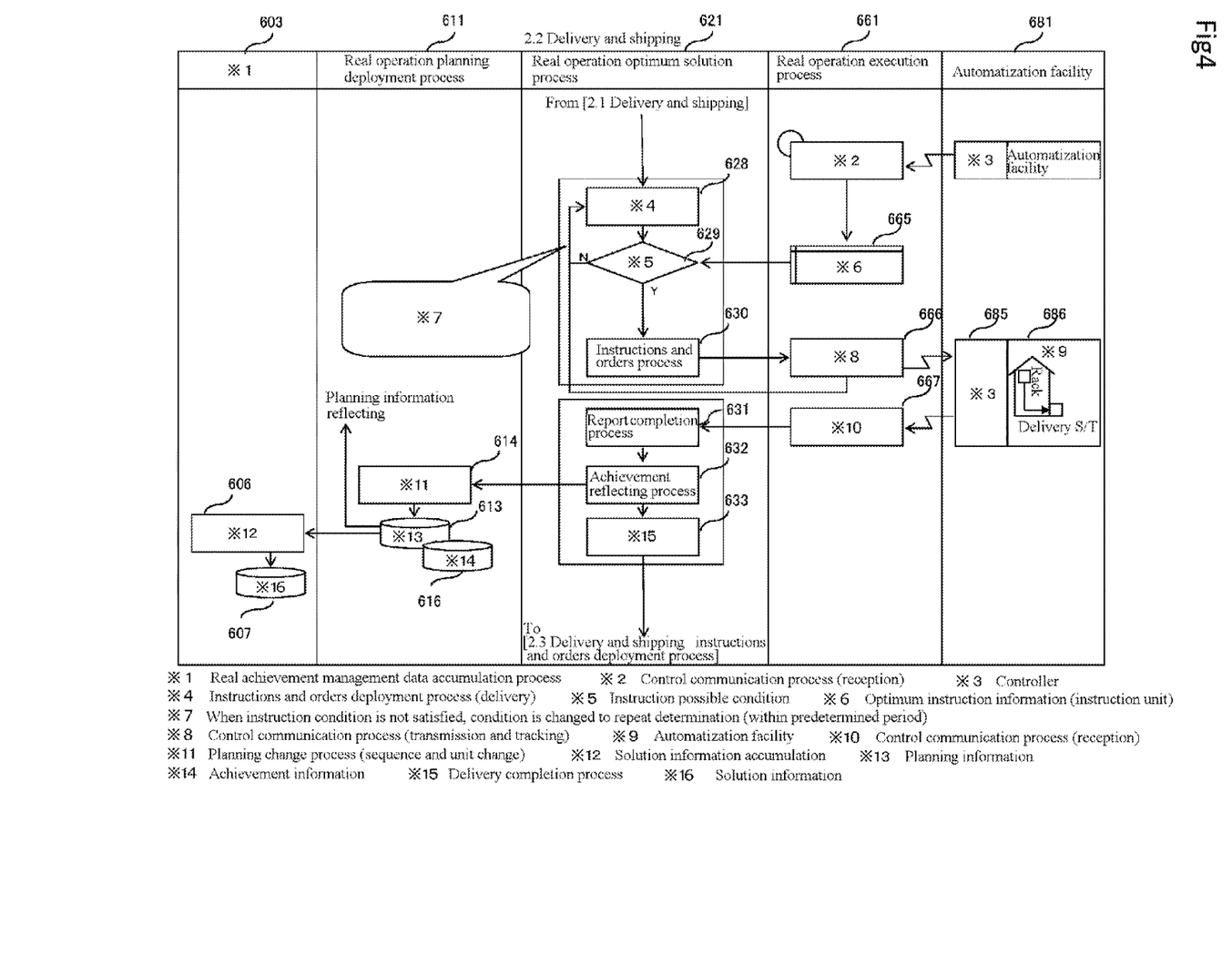
FIG. 4 is a flowchart of a function of the logistics-solution intranet system of the embodiment.

Next, after determining an execution sequence, as illustrated in FIG. 4, the real operation optimum solution process 621 determines the instruction with respect to a controller 685 of an automatization facility 686 from optimum instruction information (the automatization system status, an operation operating status, and conveyance route information) 665 required for an instruction unit, as an instruction condition in real time (629 in FIG. 5), based on execution sequence data (628 in FIG. 4) to execute an instructions and commands process 630 in real time.

The real operation optimum solution process 621 determines the instruction condition from the optimum instruction information (the automatization system status, the operation status, and the conveyance route information) 665 required for the instruction in real time, while timing the facility status, based on the determined delivery instruction, repeats the determination with changing the condition until the instruction condition is fulfilled (628 and 629), and then transmits an instruction command to the real operation execution process 661 when the condition has fulfilled a range of the instruction condition. Then, the real operation execution process 661 transmits the instructions and commands to the controller 685 attached to the automatization facility 686 via the communication network 682 (666) to hold tracking data (data during conveyance).

Within a predetermined period set at the beginning, a communication information process (a conversation method) is repeatedly executed to execute the operation of reprocessing with an optimum determination. At this time, if the instruction condition is not right, the real operation optimum solution process 621 executes an optimum operation information process based on a priority instruction in the optimum instruction information.

Furthermore, when the real operation execution process 661 performs a reception 667 of completion import data from the controller 685 of the automatization facility 686, the real operation-optimum solution process 621 executes a report completion process 631 and a data process 633 of the tracking data (the data during conveyance) and the delivery completion. At this time, performance data and the shipping planning information created at the intranet real operation planning deployment process 611 are reflected (a status change of the shipping instruction) (632, 614, 613, and 616). The performance data is accumulated in an intranet real achievement management data bank to be stored in a state where the data can be extracted any time (606 and 607).

Figure 5:
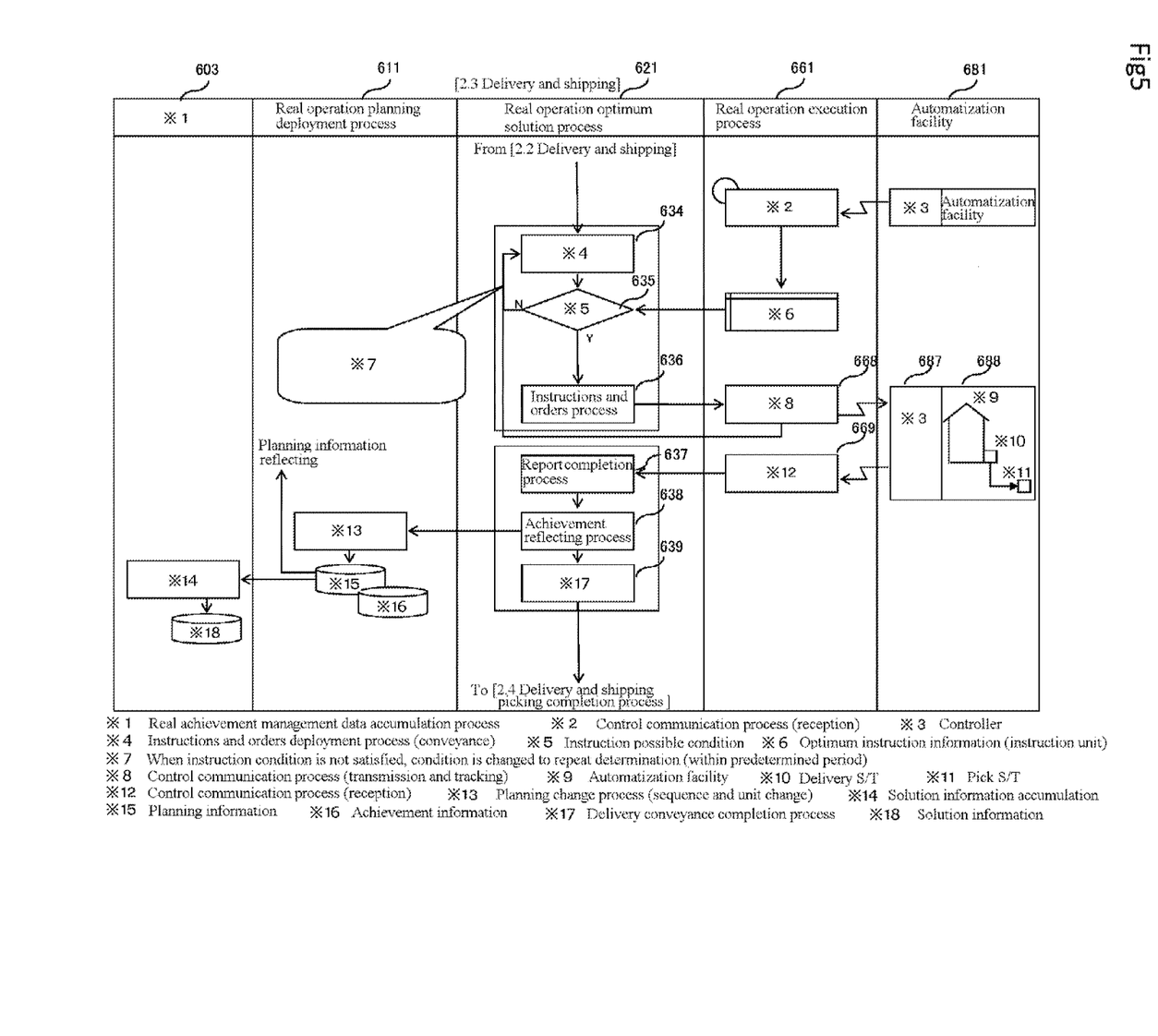
FIG. 5 is a flowchart of a function of the logistics-solution intranet system of the embodiment.

Next, as illustrated in FIG. 5, the conveyance operation of the intranet real operation optimum solution process 621 determines a next conveyance destination at a delivery completion report process, determines a next instruction condition from the optimum instruction information (the automatization system status, the operation status, and the conveyance route information) required for the next instruction in real time while timing the facility status (634, 635, and 636), repeats the determination with changing the condition until the instruction condition is fulfilled, and then transmits the instructions and commands to a controller 687 attached to an automatization facility 688 via the communication network 682 when fulfilling the range of the instruction condition, to hold the tracking data (the data during conveyance) (668).

Within the predetermined period set at the beginning, the communication information process (the conversation method) is repeatedly executed to execute the operation of the reprocessing with the optimum determination. At this time, if the instruction condition is not right, the real operation optimum solution process 621 executes the optimum/operation information process based on the priority instruction in the optimum instruction information.

Furthermore, the intranet operation execution process 661 performs a reception 669 of the completion report data from the automatization facility to process the tracking data (the data during conveyance) and the data of a delivery conveyance completion (637 and 639 in FIG. 5). At this time, the performance data and the shipping planning information created at the intranet real operation planning deployment process 611 are reflected (a states change of the shipping instruction) (638 in FIG. 5). The performance data is accumulated in the intranet real achievement management data bank to be stored in the state where the data can be extracted any time.

Figure 6:
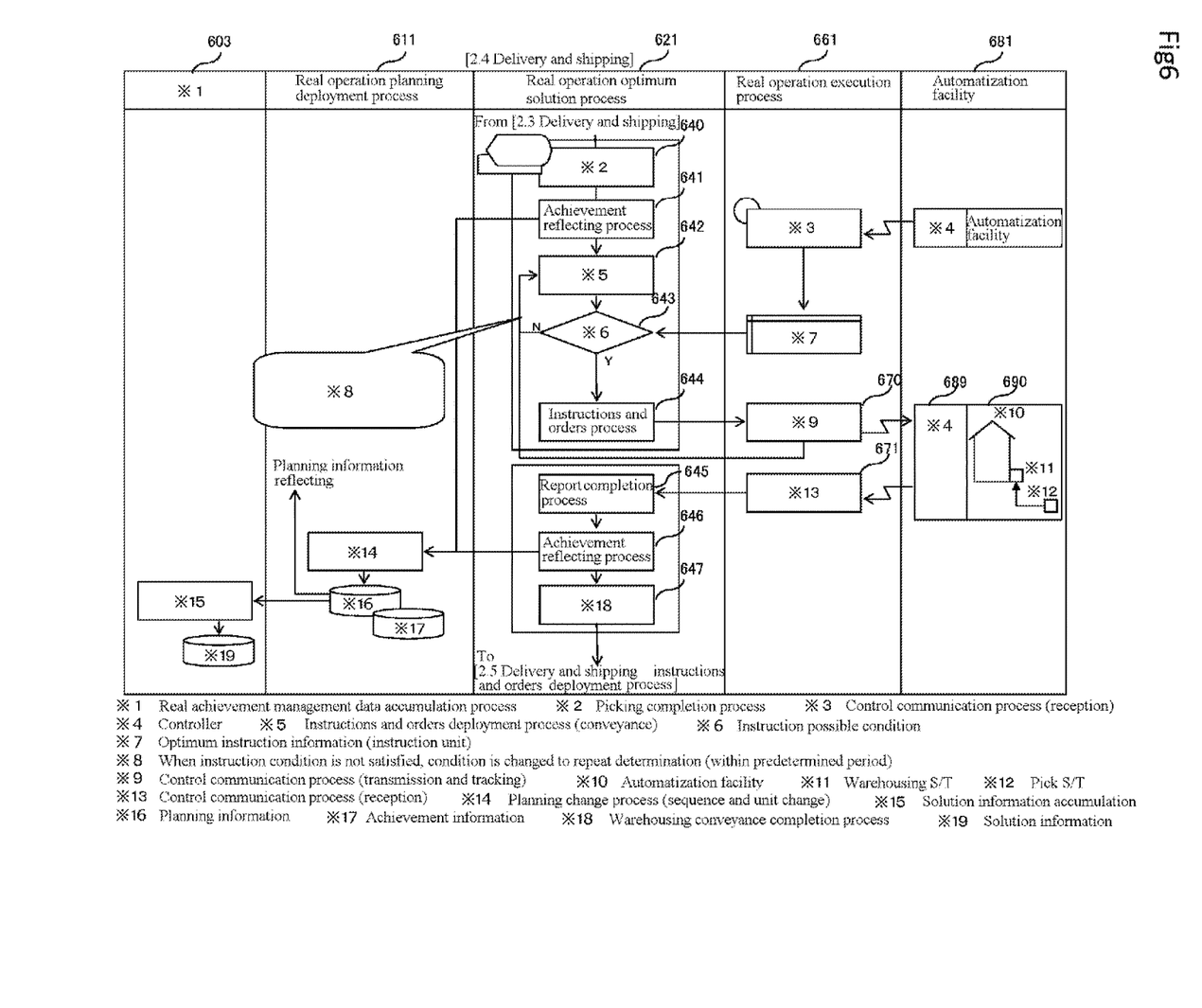
FIG. 6 is a flowchart of a function of the logistics-solution intranet system of the embodiment.

Next, as illustrated in FIG. 6, the picking operation of the intranet real operation optimum solution process 621 executes operational operation according to the picking instruction displayed on a terminal of the intranet real operation optimum solution process 621, performs a reflection (the status change of the shipping instruction) 641 of the performance data and the shipping planning information created at the intranet real operation planning deployment process 611 by a picking completion process 640. The performance data is accumulated in the intranet real achievement management data bank to be stored in the state where the data can be extracted any time. At the same time, the picking operation of the intranet-system real operation optimum solution process 621 determines the next instruction condition from the optimum instruction information (the automatization system status, the operation states, and the conveyance route information) required for a rewarehousing instruction in real time while timing the facility status (642 and 643), repeats the determination with changing the condition until the instruction condition is fulfilled, and then transmits the instructions and commands to a controller 689 attached to an automatization facility 690 via the communication network 682 (644 and 670) when fulfilling the range of the instruction condition, to hold the tracking data (the data during conveyance).

Within the predetermined period set at the beginning, the communication information process (the conversation method) is repeatedly executed to execute the operation of the reprocessing with the optimum determination. At this time, if the instruction condition is not right, the real operation optimum solution process 621 executes the optimum operation information process based on the priority instruction in the optimum instruction information.

Furthermore, when the intranet operation execution process 661 performs a reception 671 of the completion report data from the controller 689 of the automatization facility 690, the real operation optimum solution process 621 process the tracking data (the data during conveyance) and the data of a warehousing conveyance completion (645, 646, and 647). At this time, the performance data and the shipping planning information created at the intranet real operation planning deployment process 611 are reflected (a status change of the shipping instruction). The performance data is accumulated in the intranet real achievement management data bank to be stored in the state where the data can be extracted any time.

Figure 7:
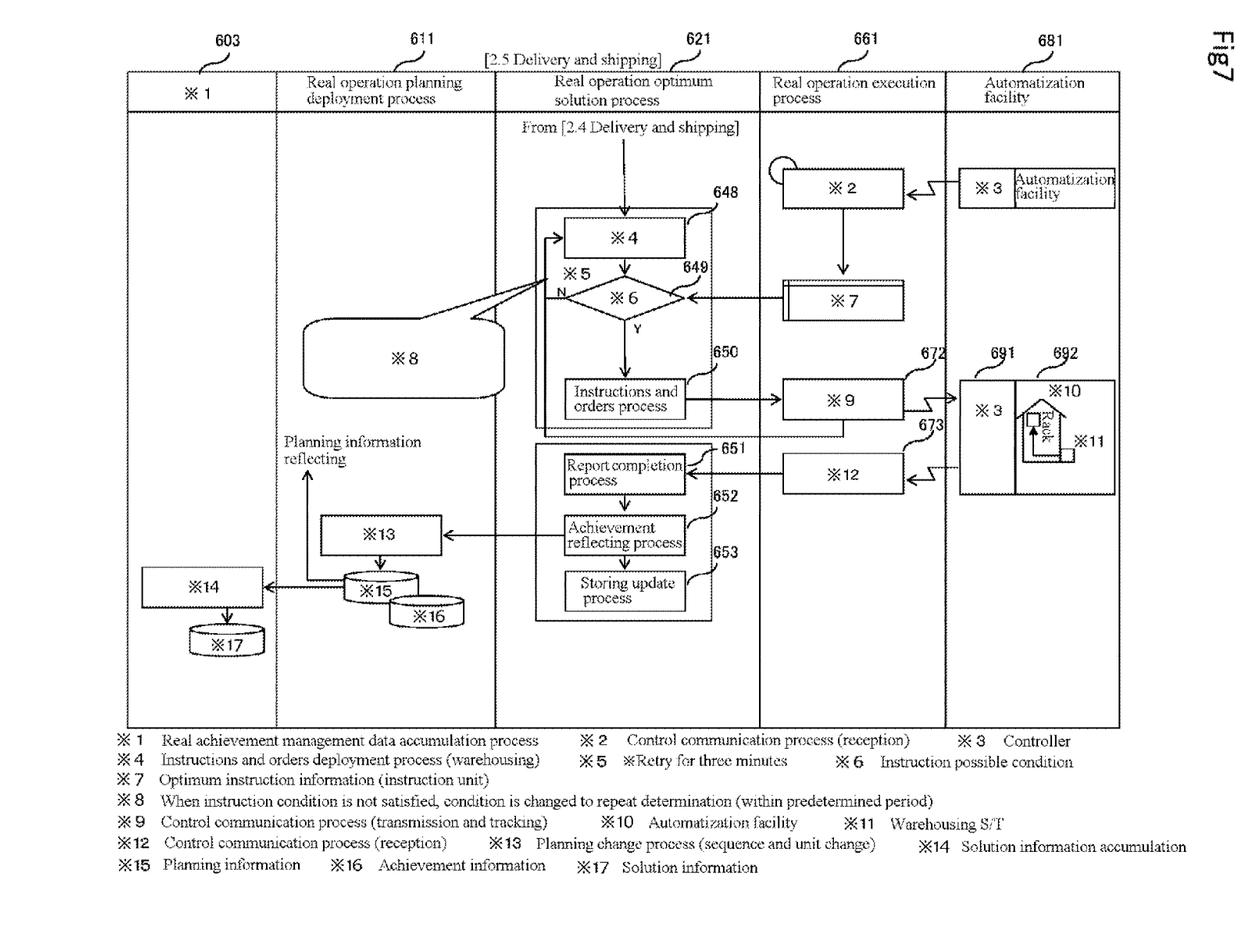
FIG. 7 is a flowchart of a function of the logistics-solution intranet system of the embodiment.

Next, as illustrated is FIG. 7, the warehousing operation of the intranet real operation optimum solution process 621 determines the next conveyance destination (the rack) at a warehousing conveyance completion process, determines a warehousing instruction condition from the optimum instruction information (the automatization system status, the operation status, and the conveyance route information) required for a warehousing instruction in real time while timing the facility status (648 and 649), repeats the determination with changing the condition until the warehousing instruction condition is fulfilled, and then transmits the instructions and commands to a controller 691 attached to an automatization facility 692 via the communication network 682 (650 and 672) when fulfilling the range of the warehousing instruction condition, to hold the tracking data (the data during conveyance).

Within the predetermined period set at the beginning, the communication information process (the conversation method) is repeatedly executed to execute the operation of the reprocessing with the optimum determination. At this time, if the instruction condition is not right, the real operation optimum solution process 621 executes the optimum operation information process based on the priority instruction in the optimum instruction information.

Last, when the intranet operation execution process 661 receives (673) the completion report data from the controller 691 of the automatization facility 692, the real operation optimum solution process 621 processes the tracking data (the data during conveyance) and the data of the storing completion (651, 652, and 653). At this time, the performance data is reflected (a status change of the warehousing instruction). The performance data is accumulated in the intranet real achievement management data back to be stored in the state where the data can be extracted any time.

At the above-described processes, when repeating the communication information process (the conversation method), the processes are retried within the predetermined periods set at the beginning. These initial setting periods are changeable as necessary.

As described above in detail, in the logistics-solution intranet system of this embodiment, the planning system, the execution system, and the optimum solution deployment processing unit use the identical hardware to be constituted using the identical operating system. Then, all the information regarding the logistics is stored in the data bank (accessible), thus ensuring acquisition at an appropriate timing as necessary. Therefore, necessary information, configuration, and processes can be grasped. Thus, for example, when a change of design is required, or when a trouble occurs, an on-site operator can deal by an optimum process. Accordingly, the logistics-solution intranet system of this embodiment ensures more effective process planning and execution of various processes in the logistics and monitors the process status to ensure a real time correspondence when a change occurs in the process status.

Figure 8:
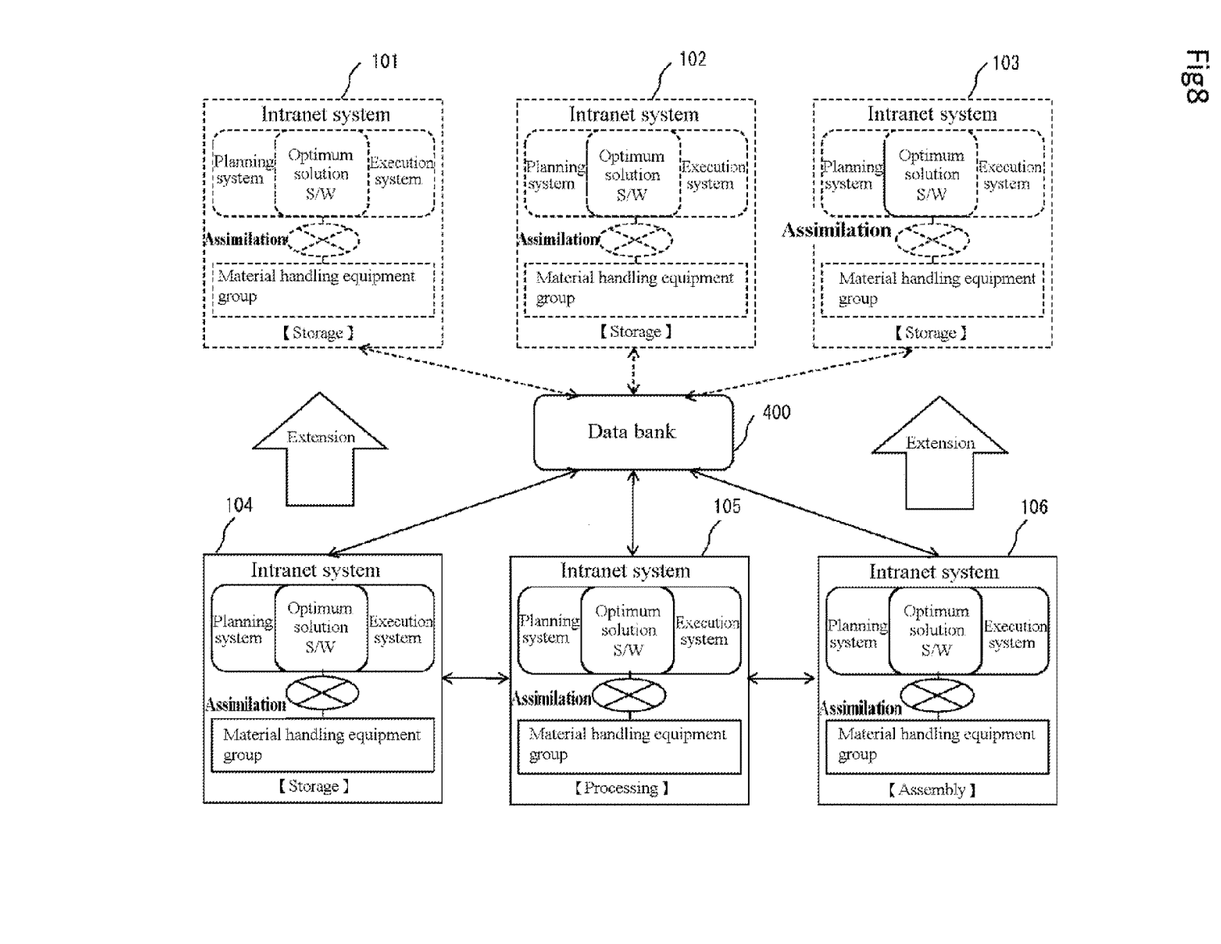
FIG. 8 is a drawing that illustrates an application example of the logistics-solution intranet system of the present invention.

FIG. 8 is a drawing illustrating an application example of the logistics-solution intranet system of the present invention.

The logistics-solution intranet system of the present invention executes base deployment of the logistics-solution intranet system (the intranet-system planning system and the intranet-system execution system) processed by the identical operating system using the identical hardware by work units and controls subordinate operation device controller groups to ensure correspondence for extensible large-scale systemization.

This allows respective logistics-solution intranet systems (intranet-system planning systems and intranet-system execution systems) 101 to 106 to concentratedly accumulate and manage the solution information in a data bank 400 to take out necessary data when required. This ensures function extension via the data bank 400 between the respective logistics-solution intranet systems 101 to 106 having functions of the intranet-system planning systems, intranet optimum solution deployment processing units, and the intranet-system execution systems for ensuring the optimum operation in the logistics operation.

When a process speed is required for, for example, increase of transaction amount an H/W compatible for an optimum function composition is selected, and the respective logistics-solution intranet systems (the intranet-system planning systems and the intranet-system execution systems) have a DB. However, decentralization ensures a high-speed transaction process to achieve deployment into a configuration having scalability as illustrated in FIG. 8.

As described above, the logistics-solution intranet system of the present invention has been described based on the embodiments. However, the embodiments are example. The present invention may be variously modified or changed without departing from the claims of the present invention.

DESCRIPTION OF REFERENCE SIGNS

1, 10, 101, 102, 103, 104, 105, 106: Logistics-solution intranet system
2, 20: Communication network
3, 30: Upper business system
4, 40, 400: Intranet-system data bank
5, 50: Intranet-system planning system
6, 60: Intranet optimum solution deployment processing unit
7, 70: Intranet-system execution system
8, 80: Communication network
9, 90: Operation device controller group
91: Upper business system
92, 95, 98: Communication network
93: WMS
94: DWH
96, 97: Integrated controller
99: Operation device group

The invention claimed is:

1. A logistics-solution intranet system that plans and executes an optimum solution system in a logistics process, comprising:
   a data bank for storing information regarding predetermined logistics;
   planning means for planning a process of a logistics solution based on the information regarding the predetermined logistics;
   execution means for transmitting execution process information that an operation target device executes, based on the process planned by the planning means;
   a controller for controlling the operation target device, the controller receiving the execution process information of the operation target device from the execution means, operating the operation target device based on the execution process information, and transmitting a work state of the operation target device;
   optimum process deployment means for controlling the entire logistics-solution intranet system based on the information regarding the predetermined logistics; and
   a network for mutually communicatively coupling the planning means, the execution means, and the optimum process deployment means to the controller, wherein:
   the planning means, the execution means, and the optimum process deployment means execute deployment of a logistics solution in communication information processing (a conversation method) into which operation software having respective functions is used, and use identical hardware to be configured using an identical operating system,
   the controller transmits operation-completion information and status information of the operation target device to the execution means,
   the execution means obtains a facility status of the operation target device from the operation completion information and the status information and transmits the execution process information in real time while attaining synchronization between the operation target devices,
   the optimum process deployment means monitors work state of the operation target devices in real time, determines whether the execution unit deployment process created by the planning means based on the shipping schedule is optimum based on the work state of the operation target device received from the controller through the execution means and the information regarding the logistics, and transmits a conversation method information signal that indicates replanning of the process to the planning means when the execution unit deployment process is determined to be not optimum,
   when the planning, means receives the conversation method information signal that indicates the replanning of the process, the planning means replans the process to transmit new shipping schedule to the optimum process deployment means,
   the optimum process deployment means determines whether the new process planning is optimum,
   the optimum process deployment means determines whether the execution unit deployment process based on the new shipping schedule is optimum,
   when the execution unit deployment process is determined optimum, the optimum process deployment means determines whether stock allocation process is optimum based on the work state of the operation target device received from the controller through the execution means;

when the stock allocation process is determined not optimum, the optimum process deployment means transmits a conversation method information signal that indicates replanning of the process to the planning means, when the planning means receives the conversation method information signal that indicates the replanning of the process, the planning means replans the process to transmit new process planning to the optimum process deployment means, and the data bank stores information regarding the predetermined logistics, information of the process planning of the planning means and information of an execution process of the execution means with control of the optimum process deployment means, and when updated information is present, the updated information is stored so that the data can be extracted any time.

2. The logistics-solution intranet system according to claim 1, wherein:

the optimum process deployment means obtains the work state of the operation target device from the controller during the operation of the operation target device, and transmits a conversation method information signal that indicates replanning of the process to the planning means when the planned process and the work state are determined to be different after comparison, when the planning means receives the conversation method information signal that indicates the replanning of the process, the planning means replans the process to transmit new process planning to the optimum process deployment means, and the optimum process deployment means determines whether the new process planning is optimum, and transmits the process planning to the execution means when the new process planning is determined to be optimum, and transmits a conversation method information signal that indicates the replanning of the process to the planning means when the new process planning is determined to be not optimum.

3. The logistics-solution intranet system according to claim 1, wherein the optimum process deployment means for a delivery instruction, determines a condition of the delivery instruction from the work state of the operation target device in real time, repeats the determination with changing the condition until the condition is fulfilled and when the condition is fulfilled, transmits the delivery instruction command to the execution means, determines a next conveyance destination when a delivery completion report is received, for a conveyance instruction of the conveyance destination, determines a condition of the delivery instruction from the work state of the operation target device in real time, repeats the determination with changing the condition until the condition is fulfilled and when the condition is fulfilled, transmits the conveyance instruction command to the execution means, after completion of picking, for a warehousing instruction, determines a condition of the warehousing instruction from the work state of the operation target device in real time, repeats the determination with changing the condition until the condition is fulfilled and when the condition if fulfilled, transmits the warehousing instruction command to the execution means, and determines a next conveyance destination in a warehouse when the completion of the warehousing is received, for a warehousing instruction of the next conveyance destination, determines a condition of the warehousing instruction of the next conveyance destination from the work state of the operation target device in real time, repeats the determination with changing the condition until the condition is fulfilled and when the condition is fulfilled, transmits the warehousing instruction of the next conveyance destination to the execution means.

4. A logistics solution system comprising:

a plurality of logistics-solution intranet systems according to claim 1, each of the plurality of logistics-solution intranet systems is provided at every operation unit;

the data bank of the plurality of logistics-solution intranet systems is a shared data bank, and accumulate and manage information regarding predetermined logistics, information of process plan by the planning means with the control of the optimum process deployment means and information of the execution process by the execution means and the updated information.

* * * * *